United States Patent [19]

Smith

[11] 4,446,730

[45] May 8, 1984

[54] SPECIFIC GRAVITY INDEPENDENT GAUGING OF LIQUID FILLED TANKS

[75] Inventor: George E. Smith, Houston, Tex.

[73] Assignee: Quintex Research International, Inc., Missouri City, Tex.

[21] Appl. No.: 371,789

[22] Filed: Apr. 26, 1982

[51] Int. Cl.$^3$ .................................................. G01F 23/18
[52] U.S. Cl. ............................................. 73/301; 73/438
[58] Field of Search ................. 73/301, 438, 149, 719, 73/290 B, 291

[56] References Cited

U.S. PATENT DOCUMENTS

| | | | |
|---|---|---|---|
| 3,038,336 | 6/1962 | Peters | 73/301 X |
| 3,045,492 | 7/1962 | Kutzler | 73/719 |
| 3,397,581 | 8/1968 | Bush | 73/719 X |
| 4,006,635 | 2/1977 | Khoï | 73/301 X |
| 4,043,193 | 8/1977 | Bailey | 73/438 X |
| 4,109,531 | 8/1978 | Lawford et al. | 73/301 X |
| 4,262,531 | 4/1981 | Hewitt et al. | 73/149 X |
| 4,358,956 | 11/1982 | Ruben et al. | 73/301 |

Primary Examiner—Jerry W. Myracle
Assistant Examiner—Tom Noland
Attorney, Agent, or Firm—Vaden, Eickenroht, Thompson, Bednar & Jamison

[57] ABSTRACT

A liquid sensing and gauging method and apparatus employing a differential pressure sensing device located near the bottom of the tank and an absolute pressure sensing device located at the same level as one of the differential pressure sensing device elements. The differential sensing device is connected for driving the arm of a potentiometer included in an electronic circuit to develop an intermediate voltage exponentially proportional to the reciprocal of the specific gravity of the tank liquid. Similarly, the absolute pressure sensing device is connected for driving the arm of a potentiometer which is biased by the intermediate voltage. The output on this arm is then indicative of the height of the tank liquid only, regardless of the specific gravity of the liquid. The height level output can be multiplied by an area voltage to indicate tank volume. This tank volume voltage can be added to other similar outputs to indicate total system volume of a system comprising a plurality of tanks.

13 Claims, 3 Drawing Figures

SPECIFIC GRAVITY INDEPENDENT GAUGING OF LIQUID FILLED TANKS

BACKGROUND OF THE INVENTION

1. Field of the Invention

This invention pertains to the measuring of liquid levels and volumes in tanks and more particularly to techniques for monitoring such levels and volumes in a plurality of tanks, typically mud tanks employed in a drilling operation.

2. Description of the Prior Art

Huge fluid systems, such as mud systems employed in an oil field drilling operation, often need to be closely monitored, for the condition of such fluid system is revealing as to other conditions that exist with the procedure or with the environment of the procedure supported by the fluid system. For example, in a mud system, a high-pressure gas or liquid infusion during the circulation of the mud downhole will be revealed by a rise in the mud reservoir. In similar fashion, drilling into an extremely porous, unpressurized formation will cause fluid loss and a drop in reservoir level.

In addition to monitoring for level changes, it has been common to monitor for mud weight. When initially formulating the "mud" or drilling fluid, such instruments will reveal when the "weight", which equates with specific gravity or density, is proper. Specific gravity is defined as the ratio of the weight of a fixed volume of an unknown liquid divided by the weight of an identical volume of water. Density is a similar term usually applied to solids, but for purposes herein the two terms are used interchangeably. "Mud weight" is also an equivalent term when applied to drilling fluids of liquids. Some instrumentation in the prior art will detect a change of "mud weight" during operation as a sign that something is amiss. For example, encountering a gas pocket during drilling will infuse gas into the fluid and will cause a decrease in the specific gravity of the fluid. Actually, however, in an on-going drilling operation, a readout of "mud weight" is relatively unimportant. A reading of level change is important.

Early instrumentation, and much of the instrumentation used today, for monitoring levels in reservoir tanks utilize floats that ride on the surface of the liquid in the tank. Such floats are usually confined to a wall of the tank so that when the level either rises or falls, the float activates a level sending device mounted on the wall.

Although such actuating devices work well with liquid that is relatively clean and with liquids relatively free from turbulence, floats are notoriously unreliable in conditions that usually exist in a mud reservoir or tank. In fact, any measuring device which is dependent on a rising or lowering movement is susceptible to hang-up. Further, such devices, even when they work, are not extremely sensitive to changes in level. That is, there can be a change of several percent in the level of the tank before a float system will detect this because current float-coupled, level-transmitting devices are of relatively low resolution.

U.S. Pat. No. 4,043,193, John M. Bailey, reveals a non-float system for measuring and calculating the liquid "mud weight" condition of a tank and, therefrom, calculating the tank level. In the system described therein, two independent pressure sensitive elements are employed at two respectively different levels within the tank, each being sensitive to the absolute pressure at its location. The absolute pressure is, in turn, directly dependent on the height or level of the liquid and the specific gravity or density of the liquid. The outputs of the two sensors are applied to a differential pressure transmitter, which produces an output which is a measure of "mud weight" (or, specific gravity or density). The output of one of the two sensors is also applied to an absolute pressure transmitter (which output partially includes the height function). By application of the differential pressure transmitter and the absolute pressure transmitter to a Sorteberg bridge and, by adding a constant that is representative of the distance that the sensor connected to the absolute pressure transmitter is above the bottom of the tank, a measure of the tank depth or level is developed. Volume is then obtained by multiplying the depth by the cross-sectional area of the tank. The electronics required to produce the desirable output in the Bailey system requires, in addition to or instead of, the Sorteberg bridge, non-linear amplifiers, force-balance elements, log/antilog elements, and/or current, voltage or pressure booster devices to achieve the function of multiplication or division for compensating for the liquid density effects on the absolute pressure signal. The use of such active devices to perform the computations required are subject to inaccuracies.

By contrast, applicant's invention pertains to a non-float system for ascertaining tank depth or level without developing the relatively unimportant "mud weight" indication and which does not use critical active devices in such a way so as to inherently introduce errors or inaccuracies in the level readout. The "mud weight" indication is said to be relatively unimportant because changes occurring in specific gravity of the liquid are relatively slow in occurring when compared with changes in level. Therefore, as an alarm indication, changes in level are more meaningful.

Therefore, it is a feature of the present invention to provide an improved level monitor system for a mud or similar tank reservoir which produces a readout without using active non-linear electronic components.

It is another feature of the present invention to provide an improved non-float level monitor system for a reservoir including a plurality of tanks which develops a signal indicative of the total volume within all of the tanks without computing the specific gravity of the liquid within the tanks.

SUMMARY OF THE INVENTION

The illustrated invention pertains to method and apparatus for monitoring the level and/or volume of the liquid in one tank or a plurality of tanks in a liquid system. A mechanical pressure sensitive device is employed near the bottom of each tank which is linearly sensitive to a pressure difference between two monitored levels. A movable diaphragm is mechanically connected or attached to the arm of a potentiometer in a potentiometer-and-operational-amplifier combination and produces an exponentially nonlinear voltage which is proportional to the reciprocal of the specific gravity of the tank liquid. One of the levels sensed by the differential pressure sensing device also is sensed by an absolute pressure sensing device having a movable diaphragm attached to the arm of a second potentiometer. The fixed resistor of this second potentiometer is biased by the output of the previously mentioned potentiometer-and-operational-amplifier. The movement of the second diaphragm is directly proportional to changes in level and in specific gravity. When the connections are made in the above manner, however, the specific gravity components cancel each other so that the output voltage appearing on the arm of the second potentiometer is a measure of the liquid level in the tank only. The movement of the first diaphragm is directly proportional to changes in specific gravity and is insensitive to changes in liquid level of the tank. The change of specific gravity is inversely proportional to the output voltage used as the aformentioned bias voltage.

The level voltage can be conveniently multiplied by a manually-entered input signal, typically a voltage representative of the tank cross-sectional area to produce a volume signal. Multiple volume signals from respective separate tank monitor devices just described can then be added to produce a total volume output voltage.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the drawings, which drawings from a part of this specification. It is to be noted, however, that the appended drawings illustrate only preferred embodiments of the invention and are, therefore, not to be considered limiting of its scope for the invention may admit to other equally effective embodiments.

IN THE DRAWINGS

Figure 1:
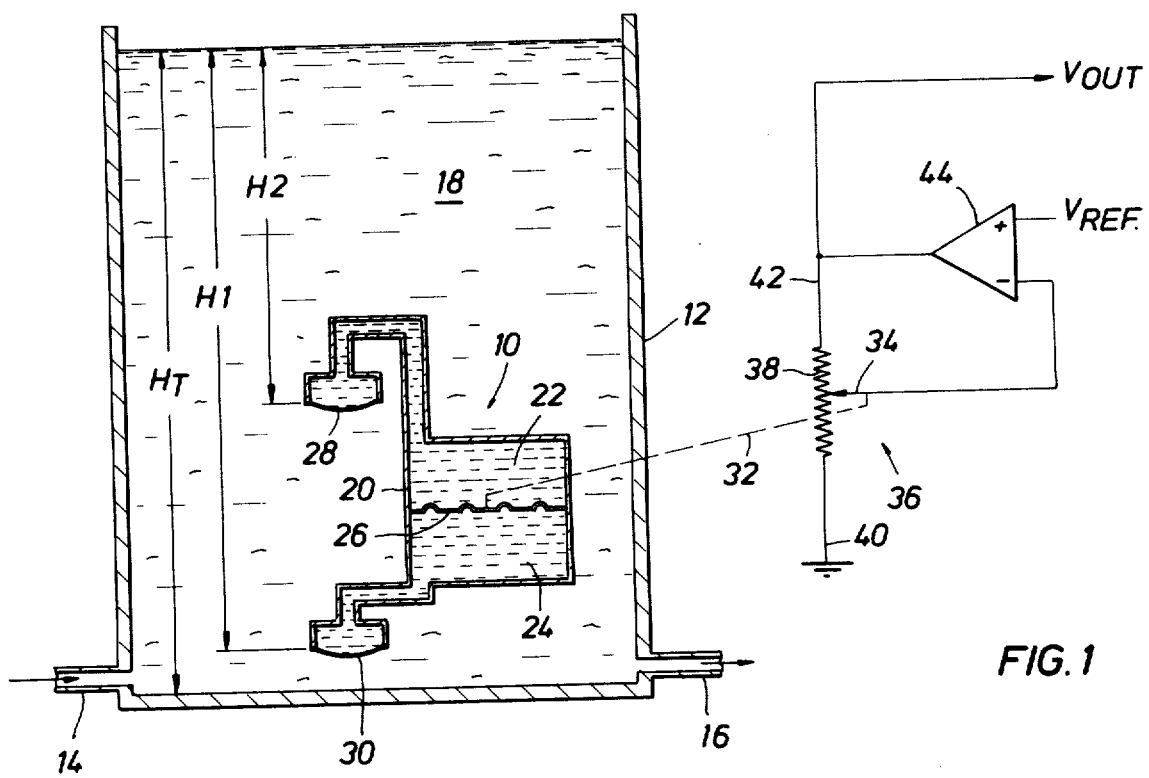

FIG. 1 is a schematic representation of a preferred first embodiment of the described invention, showing both the basic mechanical and basic electronic portions.

Figure 2:
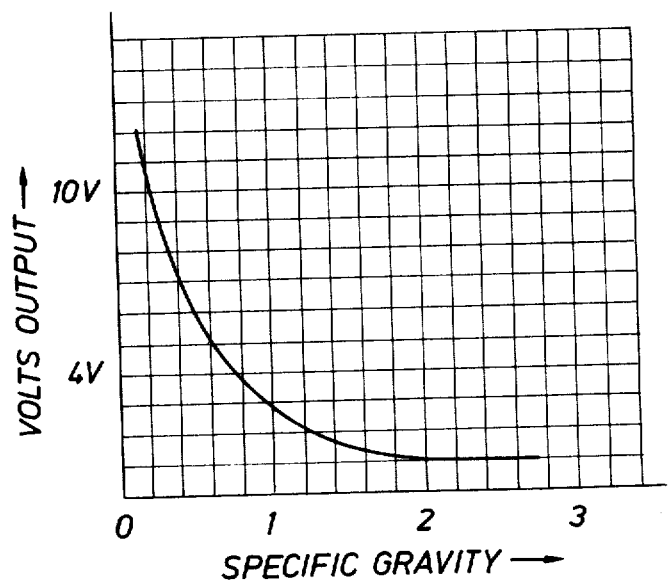

FIG. 2 is a graph of output voltage vs. specific gravity for the embodiment shown in FIG. 1.

Figure 3:
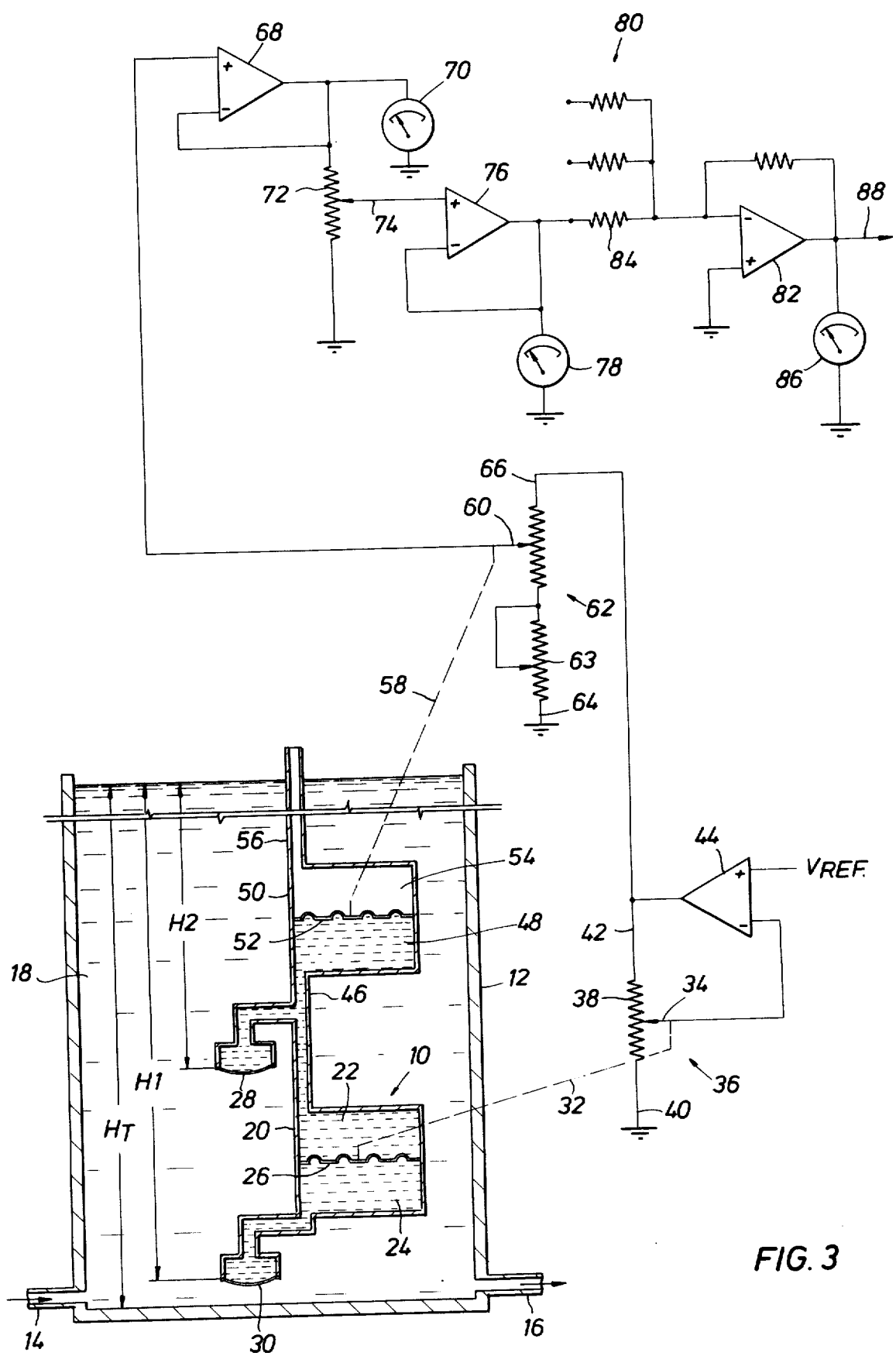

FIG. 3 is a schematic representation of a preferred second and system embodiment of the described invention, showing both the basic mechanical and basic electronic portions.

DESCRIPTION OF THE PREFERRED EMBODIMENTS

Now referring to the drawings and first to FIG. 1, a schematic representation of the mechanical and electrical portions of a basic pressure difference sensing device 10 is illustrated. Device 10 is located near the bottom of a tank 12, which is typically one of the component parts of a liquid system connected to inlet port 14 and outlet port 16, respectively. However, the total system may be comprised of only a single tank and these ports, in such event, are connected respectively to a source of liquid 18 and the operating system (not shown). A typical mud system for an oil well drilling operation utilizes a mud liquid having a mud weight with a mid-range of 8–16 pounds per gallon. Mud weights in excess of 20 pounds per gallon and below 7 pounds per gallon are not uncommon. This equates to an approximate operating specific gravity range between 0.8 and 2.5.

The structural configuration of tank 12 may be of any convenient shape; however, typically the tank is rectangular and is of known height and cross-sectional area. The FIG. 1 illustration is not intended to be anywhere near scale, but is illustrated in the form shown for convenience.

Device 10 comprises a housing 20 which is divided into an upper compartment 22 and a lower housing compartment 24 separated by a diaphragm 26. Both compartments are completely filled with an electronically compatible, low viscosity liquid. Transmission fluid used in conventional automobiles is one such acceptable fluid. Compartment 22 is connected to a sensing diaphragm 28 located at a first level $H_2$, which is the vertical distance from the surface level of the liquid in the tank to sensor 28. Compartment 24, which is the lower compartment in housing 20, is connected to a second sensing diaphragm 30 located at a distance $H_1$ from the surface level of the liquid in the tank. Normally, the sensing diaphragms are located about one foot apart. Since diaphragm 30 may be very close to the bottom, it must be free of sediment and other solid contaminants, such as sand and chips, that may hinder the free action of the diaphragm.

Diaphragm 26 may be of any non-electrically or non-magnetically conductive material suitable for flexing in either direction with only a slight change in pressure. A thin, corrugated neoprene or other synthetic elastomer material has been found to be acceptable. A hydrostatic difference in pressure between the sides of the diaphragm of one (1) psi should be accurately readable. An acceptable differential pressure transducer, Model 6000, made by the CIC division of Vernitech, Deer Park, N.Y., has been employed.

The diaphragm materials used for diaphragms 28 and 30 may be of slightly more flexible material than the material of diaphragm 26, although a similar material may also be employed. Please note that diaphragm 26 operates in a fairly clean and pure environment whereas fluid 18 is typically drilling mud, which may be full of corrosive contaminants, even non-soluble solid particles, and may be placed in turbulence because of the flow of fluid in port 14 and out port 16.

It may be seen that the linear movement of diaphragm 26 is dependent upon the difference in pressure which exists at level $H_1$ and level $H_2$ as sensed respectively by diaphragms 30 and 28. That is, if the pressure at these two locations were identical, then diaphragm 26 would have an equal amount of pressure transmitted via the respective diaphragms through neutral isolation fluids in the respective compartments to either side of diaphragm 26. However, diaphragm 30 is at a lower level than diaphragm 28, and it is assumed that the surface areas of these two diaphragms are equal. The absolute pressures on diaphragms 28 and 30 are each dependent upon the height of the liquid column to the surface at that diaphragm location times the specific gravity. Hence, the pressures will not be the same on these two diaphragms. Actually, the pressure on diaphragm 30 will be greater than the pressure on diaphragm 28 as determined by the difference in height therebetween since all other conditions are the same.

It may be seen that the specific gravity of the fluid at both locations is the same, but a change in specific gravity will have an effect on the movement of diaphragm 26. This may be illustrated by the following formulas:

$$P_1 = K \times SG \times H_1.$$

$$P_2 = K \times SG \times H_2.$$

$$P_1 - P_2 = K \times SG \times H_1 - K \times SG \times H_2.$$

$$= K \times SG \times (H_1 - H_2) = K_2 \times SG.$$

wherein $P_1$ is equal to the pressure on diaphragm 30,

P₂ is equal to the pressure on diaphragm 28,
K is a lumped constant,
SG is the specific gravity of fluid 18,
H₁ is the height or level of diaphragm 30,
H₂ is the height or level of diaphragm 28, and
K₂ is a second lumped constant which includes the fixed value of H₁−H₂.

Therefore, it may be seen that the difference in pressure is proportional to the specific gravity or density of the liquid and independent of height. Or, said another way, a change in specific gravity will have a bearing on the change of the difference in pressure but a change in height or H_T as shown in FIG. 1, will not have an effect on the deflection of diaphragm 26.

As further shown in FIG. 1, diaphragm 26 is mechanically linked by connector 32 to the arm 34 of a potentiometer 36 including a fixed resistor 38. One end of fixed resistor 38 is connected to circuit common, typically ground 40, and the other end 42 is connected to the output of an operational amplifier 44. A fixed voltage reference V_REF, typically 4 volts, is connected to the positive or non-inverting input of operational amplifier 44 and the negative input of operational amplifier 44 is connected to potentiometer arm 34.

Now referring to FIG. 2, the voltage output of operational amplifier 44 of FIG. 1 is diagrammed with respect to specific gravity of liquid 18. Please note that this diagram is an inverse expotential relationship. As graphed, the specific gravity is shown on the horizontal axis of the diagram and the output voltage is diagrammed on the vertical axis. As the specific gravity decreases, the output voltagre expotentially increases, which is an important relationship which exists and which is inherent in the operational amplifier connection shown in FIG. 1 when the arm of the potentiometer is connected to a diaphragm which moves linearly with the differential pressure sensed by diaphragms 28 and 30. That is, the voltage output of operational amplifier 44 is expotentially proportional to the reciprocal of the specific gravity of the fluid, as shown by the above formulas.

Now referring to FIG. 3, a simplified system utilizing the availability of the voltage which has just been described is illustrated. In FIGS. 1 and 3, like numbers are used to illustrate like components. However, in the embodiment shown in FIG. 3, upper compartment 22 of housing 20 is connected via a port 46 to the lower compartment 48 of a housing 50 which includes a compartment dividing diaphragm 52. The fluid within compartment 22, which is also filled behind diaphragm 28, also fills compartment 48, as illustrated. Upper compartment of housing 54 is not filled with this fluid but is, instead, vented through port 56 to the atmosphere above the surface of tank liquid 18.

The at-rest position of diaphragm 52 is modified either by an increase in the atmosphere, which is assumed to be steady state, or by an increase in the pressure transmitted by fluid in compartment 48. Hence, a change in the pressure sensed by diaphragm 28 will be transmitted by the fluid in the compartment to change the position of diaphragm 52 in a linear fashion. It may be recalled that the pressure of diaphragm 28 is proportional to the height of the fluid that location (H₂ × the specific gravity of fluid 18). Diaphragm 52 is mechanically linked or connected by connection 58 to arm 60 of a potentiometer 62. One end of potentiometer 62 is connected to circuit common 64 through a variable resistor 63 and the upper end 66 is connected to the output of operational amplifier 44. The purpose of resistor 63 is explained below. If end 66 were connected to a fixed voltage reference, it is apparent that the linear movement of diaphragm 52 would be proportional to the absolute pressure sensed by that diaphragm, which is the same as that sensed by diaphragm 28.

However, end 66 is connected to the output of operational amplifier 44, which as discussed above is inversely proportional to the specific gravity of the fluid. That is, the output increases with a decrease in specific gravity. Since one of the direct factors involved in the output on arm 60 is the specific gravity, the connections as shown will cancel out the effect of specific gravity on the output on arm 60. Therefore, the output on arm 60 is proportional only to height H_T, the height of liquid 18 in tank 12, as adjusted by a fixed voltage setting determined by variable resistor 63. Actually, the sensor for diaphragm 52 connected to arm 60 is sensor diaphragm 28, which is not located on the bottom of tank 12, but is vertically spaced therefrom by some distance, typically one-to-two feet. In an actual embodiment, the distance between diaphragms 28 and 30 is one foot and the entire device unit 10 is supported by a stand to hold even bottom diaphragm 30 off the bottom by an additional one foot. Therefore, diaphragm 28 is vertically displaced from the bottom of the tank by two feet. Therefore, the output on arm 60 has to be adjusted by a fixed amount, which is entered by an equivalent resistance 63 proportional to the "off tank bottom" distance entered in series with the resistance of potentiometer 62.

As the specific gravity of the fluid varies, the change in bias or exciter voltage applied to end 66 of potentiometer 62 has the same affect on both resistor 62 and resistor 63 and, therefore, on the absolute height measurement H_T. In practice, resistor 63 can be a fixed value to compensate for the space between diaphragm 28 and the tank bottom, and can be permanently installed in the overall sensor assembly inside the tank which houses both the mechanical parts and the electrical parts schematically shown in the diagram. Resistor 63 being adjustable increases the flexibility of the assembly.

The output of arm 60 of potentiometer 62 is connected to a unity gain operational amplifier 68 whose output is displayed on meter 70 in conventional fashion. Unity gain amplifier 68 is a buffer amplifier for the meter connection and for the connection to the top end of variable resistor 72. A common type of chip that can be connected for this purpose is National Semiconductor Model LM741CN. The other end of resistor 72 is connected to circuit common. Sweep arm 74 provides a means for entering an area factor related to the cross-sectional area of tank 12. The output an arm 74 is connected to another unity gain, buffer amplifier 76, the output of which is applied to meter 78 for indicating tank volume. In effect, the input provided by variable resistor 72 multiples the area factor by the height factor to provide volume.

The output of operational amplifier 76 is applied to one of several parallel resistors 80, each connected to the input of operational amplifier 82. Please note that resistor 84 which is connected to the output of operational amplifier 76 is connected in parallel with similar resistors connected to similar components of other tank measuring devices which are similar to that which has previously been described. However, these devices are each separately adjustable so the tank dimensions and even the condition of the liquids in these tanks, do not have to be the same. The parallel inputs are in affect summing resistors to provide a total system input to operational amplifier 82. Therefore, the output of operational amplifier 82 can be conveniently provided to meter 86 to give a visual display of the total tank volume and to output 88 to be applied to a chart recorder, a control system, warning systems or the like. Of course, the gauge can be calibrated for any convenient units of measurement. Note that the total volume voltage is provided using only parallel resistors and no active components. In fact, a commercially available operational amplifier 82 with summing inputs is available, for example, on a single chip as National Semiconductor LM741CN. This model can also be used for operational amplifier 44.

While a particular embodiment of the invention has been shown and described, it will be understood that the invention is not limited thereto since modifications may be made and will become apparent to those skilled in the art. For example, warning devices can be connected to the individual tank measure devices.

Also, please note that there is no direct indication of "mud weight" for fluid 18, as is provided in the prior art devices. However, if for any reason it is desired to have a mud weight reading, it should be noted that the output of a potentiometer similar to potentiometer 62 can be connected with respect to a fixed reference voltage to provide an absolute measure of the pressure on diaphragm 28. This pressure is proportional to height times specific gravity. Electronically dividing that figure by the output on arm 60 which is the measure of height alone, provides an output which is a measure of specific gravity alone. This is the "mud weight" value that is generally provided by meters or other indicators of mud weight. Other schemes using a differential pressure sensor, operational amplifiers and unity gain amplifiers similar to that which has been described can be used to develop a "mud weight" reading, but it is important to note that a mud weight signal is not used or needed for the present invention to compute or show tank volume.

Another advantage of the present system over prior art devices is that when the specific gravity approaches zero as the tank empties to the level of diaphragm 28, the signal increases nonlinearly and is therefore accurate within the operating voltage ranges of the electronic totalizing system. Even when the level is less than the height of sensor 28, the distortion is not extreme since the relative order of magnitude for resistors 62 and 63 are extremely large. Typically, resistor 62 is eqaul to 1000 ohms and resistor 63 is equal to only about 70 ohms.

What is claimed is:

1. The method of measuring the level of fluid in a tank, which comprises
    establishing a first voltage level with a first pressure sensing device sensitive to the pressure difference between a first and second level within the tank, said first voltage being exponentially proportional to the reciprocal of the specific gravity of the fluid, and
    with respect to the first voltage level as a reference voltage level, establishing a second voltage with a second pressure sensing device of the absolute pressure at one of said first and second levels, the second voltage being directly proportional to the specific gravity of the fluid, the resulting output of voltage of said second pressure sensing device being a measure of the fluid level in the tank only, and being independent of the specific gravity of the fluid.

2. The method of measuring the level of fluid in accordance with claim 1, wherein said first and second voltage levels are established by pressure sensitive devices located at fixed positions near the bottom of the tank.

3. The method of measuring the volume of fluid in a tank, having a known cross-sectional area, which comprises
    measuring the level of fluid in the tank, including
        establishing a first voltage level with a first pressure sensing device sensitive to the pressure difference between a first and second level within the tank, said first voltage being exponentially proportional to the reciprocal of the specific gravity of the fluid, and
        with respect to the first voltage level as a reference voltage level, establishing a second voltage with a second pressure sensing device of the absolute pressure at one of said first and second levels, the second voltage being directly proportional to the specific gravity of the fluid, the resulting output voltage of said second pressure sensing device being a measure of the fluid level in the tank only, and being independent of the specific gravity of the fluid; and
    multiplying the resulting output voltage by a thrid voltage representative of the cross-sectional area of the tank to produce a tank volume voltage.

4. The method of measuring the total volume of fluid in a plurality of tanks, each of said tanks having a known cross-sectional area, which comprises for each tank
    determining a tank volume voltage by measuring the level of fluid in the tank, including
        establishing a first voltage level with a first pressure sensing device sensitive to the pressure difference between a first and second level within the tank, said first voltage being exponentially proportional to the reciprocal of the specific gravity of the fluid, and
        with respect to the first voltage level as a reference voltage level, establishing a second voltage with a second pressure sensing device of the absolute pressure at one of said first and second levels, the second voltage being directly proportional to the specific gravity of the fluid, the resulting output voltage of said second pressure sensing device being a measure of the fluid level in the tank only, and being independent of the specific gravity of the fluid, and
    multiplying the resulting output voltage by a third voltage representative of the cross-sectional area of the tank to produce a tank volume voltage; and
    adding the tank volume voltage of said second pressure devices for each of said tanks to produce a total volume output voltage.

5. Apparatus for measuring the level of fluid in a tank, comprising
    a first pressure sensing device sensitive to the pressure difference between a first level and a second level within the tank and producing a first voltage exponentially proportional to the reciprocal of the specific gravity of the fluid,
    a second pressure sensing device sensitive to the absolute pressure at one of said first level and second level and producing a second voltage directly proportional to the specific gravity of the fluid, and summing means connected to said first sensing device and said second sensing device to produce a resulting output voltage which is a measure of the fluid level in the tank only and independent of the specific gravity of the fluid.

6. Apparatus is accordance with claim 5, wherein said first pressure sensing device includes a housing divided by a chamber-dividing diaphragm and a second chamber on the other side of said diaphragm, said first and second chambers being filled with a housing fluid, first pressure drive means for imparting to said first chamber a first force proportional to the fluid pressure in the tank at said first level, second pressure drive means for imparting to said second chamber a second force proportional to the fluid pressure in the tank at said second level, and potentiometric means for producing an exponential voltage dependent on the movement of said diaphragm.

7. Apparatus in accordance with claim 6, wherein said first pressure drive means includes a first drive diaphragm which moves with respect to the difference in pressure between the pressure of the housing fluid in said first chamber of said first pressure sensing device, and the pressure of the fluid in the tank at said first level, and wherein said second pressure drive means includes a second drive diaphragm which moves with respect to the difference in pressure between the pressure of the housing fluid and said second chamber of said first pressure sensing device, and the pressure of the fluid in the tank at said second level.

8. Apparatus in accordance with claim 6, wherein said potentiometric means includes a fixed potentiometric resistor connected between circuit common and an output voltage terminal, an operational amplifier having a fixed reference input voltage and an output voltage connected to the output voltage terminal of said fixed potentiometric resistor, and a sweep potentiometric arm for riding on said fixed potentiometric resistor connected to move with said chamber-dividing diaphragm and the voltage thereon said potentiometric arm being connected as the other input voltage to said operational amplifier, a decrease in specific gravity of the fluid in said tank causing an expotential increase in said first voltage.

9. Apparatus for measuring the level of fluid in a tank, comprising:

a first pressure sensing device sensitive to the pressure difference between a first level and a second level within the tank and producing a first voltage exponentially proportional to the reciprocal of the specific gravity of the fluid, including a housing divided by a chamber-dividing diaphragm and a second chamber on the other side of said diaphragm, said first and second chambers being filled with a housing fluid, first pressure drive means for imparting to said first chamber a first force proportional to the fluid pressure in the tank at said first level, including a first drive diaphragm which moves with respect to the difference in pressure between pressure of the housing fluid in said first chamber of said first pressure sensing device and the pressure of the fluid in the tank at said first level, second pressure drive means for imparting to said chamber a second force proportional to the fluid pressure in the tank at said second level, including a second drive diaphragm which moves with respect to the difference in pressure between the pressure of the housing fluid and said second chamber of said first pressure sensing device and the pressure of the fluid in the tank at said second level, and potentiometric means for producing an exponential voltage dependent on the movement of said diaphragm;

a second pressure sensing device sensitive to the absolute pressure at one of said first level and second level and producing a second voltage directly proportional to the specific gravity of the fluid, including a housing divided by a chamber-dividing diaphragm to establish a first chamber in communication with the atmosphere and a second chamber filled with housing fluid in communication with said first chamber of the housing of said first pressure sensing device and also said first pressure drive means, and second potentiometric means connected to said chamber-dividing diaphragm of said second pressure sensing device; and summing means connected to said first sensing device and said second sensing device to produce a resulting output voltage which is a measure of the fluid level in the tank only and independent of the specific gravity of the fluid.

10. Apparatus in accordance with claim 9, wherein said second potentiometric means includes a fixed potentiometric resistor connected between circuit common and an input voltage terminal connected to said first voltage, and a sweep potentiometric arm for riding on said fixed potentiometric resistor connected to move with said chamber-dividing diaphragm of said second pressure sensing device, said resulting output voltage appearing on said sweep potentiometric arm.

11. Apparatus in accordance with claim 10, wherein said second potentiometric means includes a level-correcting resistor in series with said fixed potentiometric resistor for compensating for the distance that said first pressure drive means is above the bottom of the tank.

12. Apparatus for measuring the volume of fluid in a tank having a known cross-sectional area, comprising a first pressure sensing device sensitive to the pressure difference between a first level and a second level within the tank and producing a first voltage exponentially proportional to the reciprocal of the specific gravity of the fluid, a second pressure sensing device sensitive to the absolute pressure of one of said first level and second level and producing a second voltage directly proportional to the specific gravity of the fluid, summing means connected to said first sensing device and said second sensing device to produce a resulting output voltage which is a measure of the fluid level in the tank only and independent of the specific gravity of the fluid, and means for multiplying the resulting output voltage of said summing means by a voltage representative of the cross-sectional area of the tank to produce a volume output voltage.

13. Apparatus for measuring the volume of fluid in a plurality of tanks, each tank having a known cross-sectional area, comprising means for measuring the volume of fluid in each tank including a first pressure sensing device sensitive to the pressure difference between a first level and a second level within the tank and producing a first voltage exponentially proportional to the reciprocal of the specific gravity of the fluid, a second pressure sensing device sensitive to the absolute pressure at one of said first level and second level and producing a second voltage directly proportional to the specific gravity of the fluid, summing means connected to said first sensing device and said second sensing device to produce a resulting output voltage which is a measure of the fluid level in the tank only and independent of the specific gravity of the fluid, and means for multiplying the resulting output voltage of said summing means by a voltage representative of the cross-sectional area of the tank to produce a volume output voltage; and total summing means connected to the volume output voltage of each said plurality of tanks to produce a total volume output voltage.

* * * * *